O. A. ECKRE.
SPRING WHEEL.
APPLICATION FILED MAY 8, 1917.
1,259,004.
Patented Mar. 12, 1918.
2 SHEETS—SHEET 1.
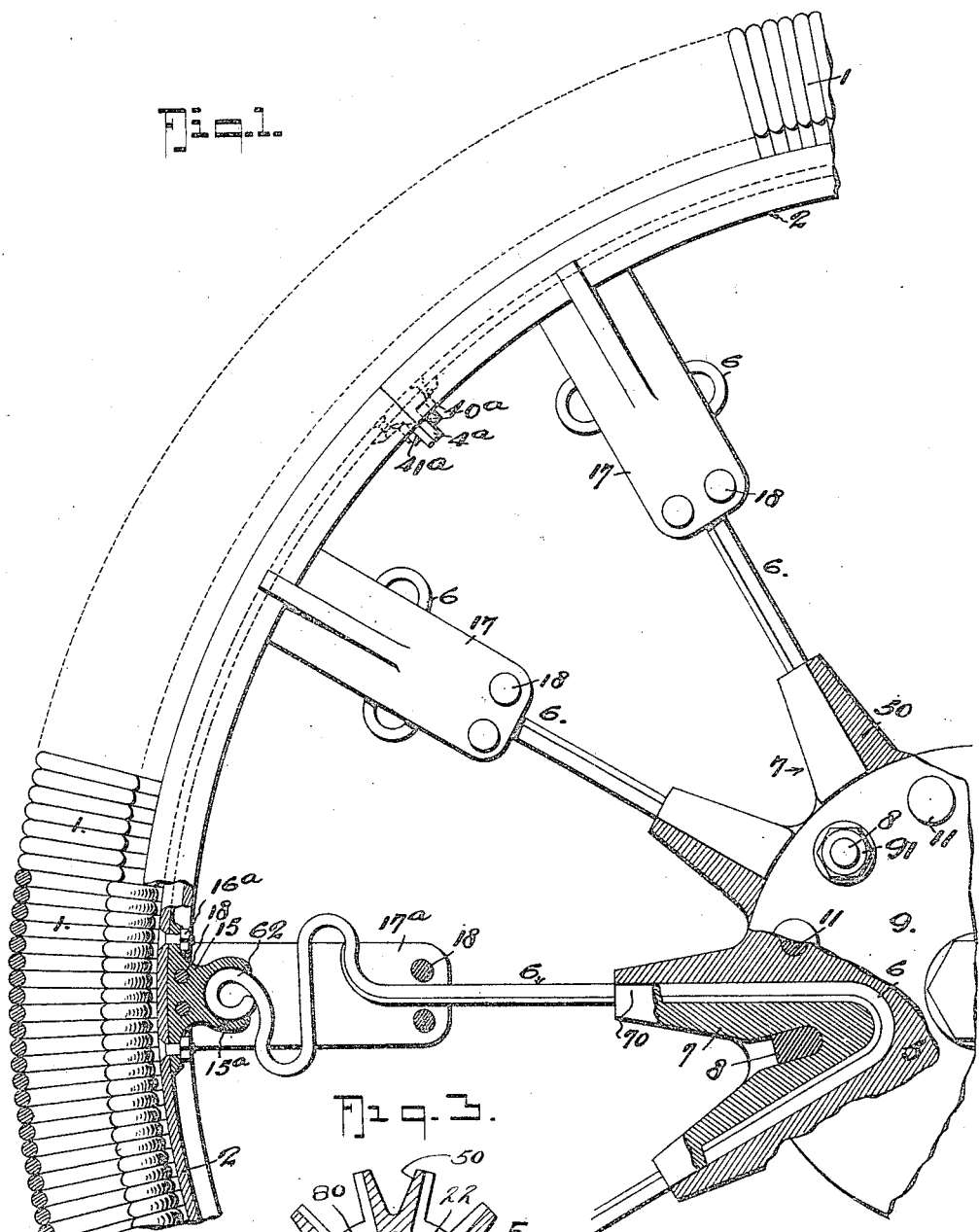
INVENTOR
Olof A. Eckre.
BY
Fred G. Dieterich
ATTORNEYS

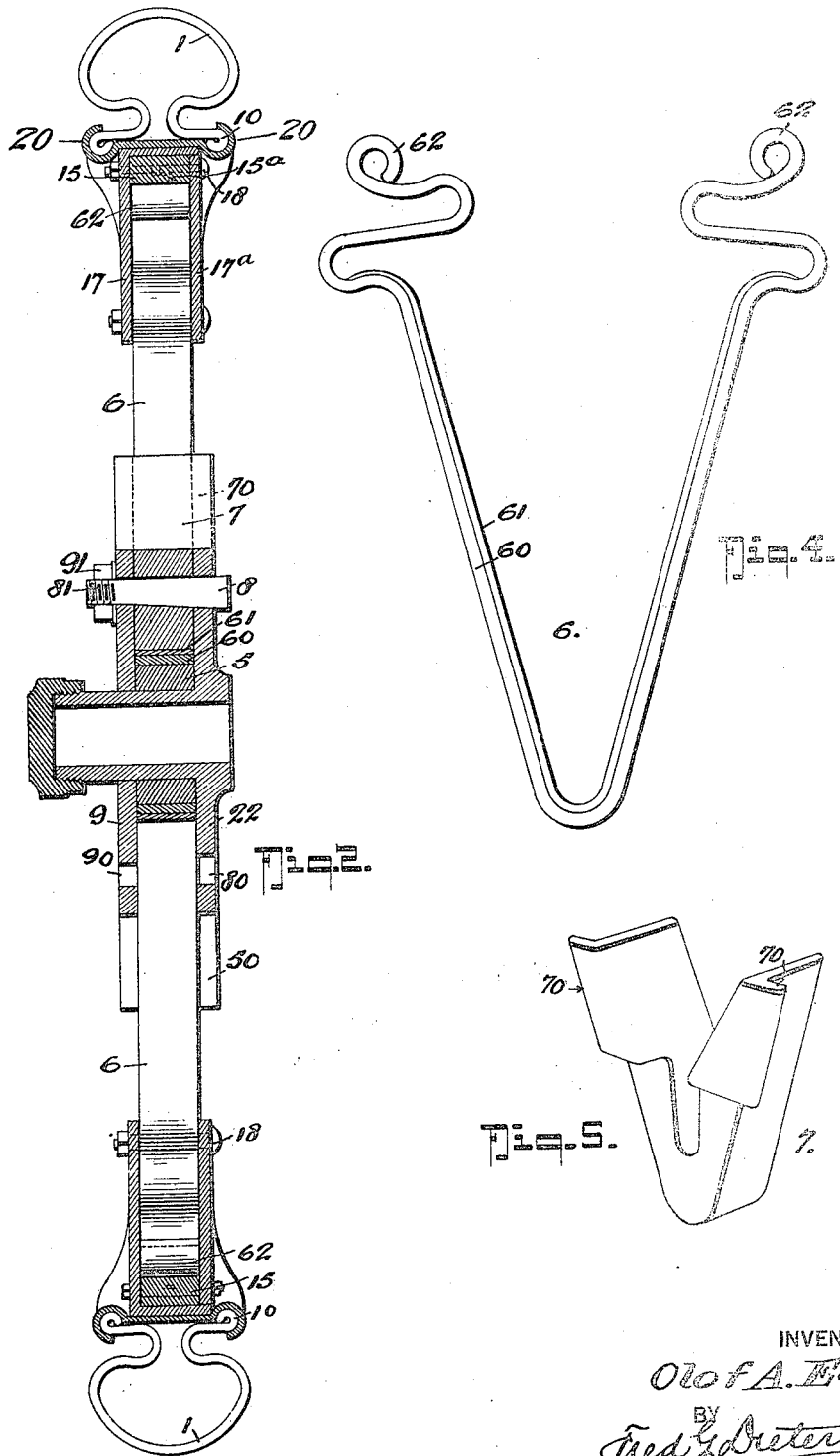

UNITED STATES PATENT OFFICE.

OLOF A. ECKRE, OF KINDRED, NORTH DAKOTA.

SPRING-WHEEL.

1,259,004.  Specification of Letters Patent.  Patented Mar. 12, 1918.

Application filed May 8, 1917. Serial No. 167,332.

*To all whom it may concern:*

Be it known that I, OLOF A. ECKRE, a citizen of the United States, residing at Kindred, in the county of Cass and State of North Dakota, have invented a new and Improved Spring-Wheel, of which the following is a specification.

This invention has reference to that class of vehicle wheels in which resilient spokes are so associated and combined with the hub and the rim to form a spring wheel and my said invention primarily has for its purpose to provide an improved construction of wheel of the general type stated in which the coöperating parts are especially designed to provide sufficient yielding of the hub, relatively to the rim or felly, for relieving the vehicle from violence of sudden shocks incident in the ordinary road travel of wheels and yet produce a wheel, as stated, of great stability, in which the parts are adapted to permit the spokes to have the required radial movement with respect to the hub and the rim or felly, due to their resiliency and with the spokes so attached to the hub and the rim that danger of the wheel dishing along the hub center is reduced to the minimum.

With other objects in view that will hereinafter be explained, my invention consists in the new construction of spring wheel which embodies the peculiar features and novel combination of the parts set out in the following description, specifically stated in the appended claims and illustrated in the accompanying drawings, in which:

Figure 1 is an elevation, partly in section, of a portion of my improved spring wheel.

Fig. 2 is a transverse section of a complete wheel, one of the V-shaped clamps being omitted.

Fig. 3 is a detail section of the hub member.

Fig. 4 is a detail view of one of the V-shaped resilient spokes.

Fig. 5 is a detail perspective view of one of the V-shaped spoke retaining clamps hereinafter referred to.

In the drawings, I have illustrated my improved spring wheel construction combined with a resilient tire construction built up of small arch shaped wire rings 1 that include end loops 10 designed for being edgewise moved into engagement with annular circular pockets 20—20 formed on the opposite edges of a metal rim 2, preferably a single member split at one point, with the split ends provided with angled brackets $4^a$ arranged for being secured by bolts and nuts $40^a$ and $41^a$, as shown in Fig. 1.

The rim construction shown constitutes, however, *per se*, no part of my present invention, since the same forms the subject matter of my copending application, Serial No. 192,001, filed September 18, 1917.

My present invention, which has reference to improved spring wheel construction, embodies a hub casting 5 formed with a series of equi-spaced radial arms 50, the adjacent edges of each pair of which are shaped to produce substantially V-shaped seats or bearing pockets 51 into which are received the inner ends of the spring spokes secured in the said pockets in the manner best shown in Figs. 1 and 2.

The spring spokes 6, all of which are constructed alike, consist each of a substantially V-shaped main heavy flat spring member 60 and a supplemental like shaped member 61 of less thickness than the main member 60 and of somewhat less length than the said member 60, as is clearly shown in Fig. 4, by reference to which it will also be seen that the supplemental spring member 61 seats against the inner face of the main member 60 and the V-shaped portions of the two spring members 60 and 61 snugly fit into the correspondingly V-shaped radial pockets 51, in the hub 5, and in which the said V-shaped portions of the springs are firmly secured by V-shaped clamps 7, one of which is shown in detail in Fig. 5.

The clamps 7 are held down against the loop ends of the spring members 60—61 by wedge shaped cross bolts 8 that pass through apertures 80 in the hub casting 5, and the tapered ends of the said bolts 8, which are threaded as at 81, after the spring spokes are assembled on the hub, are passed through apertures 90 in a hub plate 9 to receive the nuts 91,—it being understood that by tightening up the nuts 91, the wedge bolts 8 will be drawn down into the crotches of the V-shaped clamps 7 that secure the inner ends of the spoke members to the hub.

11—11 designate other bolts that fasten the hub plate 9 in the desired fixed position on the hub.

Each of the radial hub members, between which the inner ends of the springs 60 and 61 are secured, have inwardly projected lugs 12—12 that form side bearings for one of the edges of the springs 60 and 61 and the V- shaped clamp 7 has like lugs 70—70 that engage the opposite side edges of the springs 60 and 61 and the said two opposing lugs 12 and 70 serve to hold the inner ends of the springs 60 and 61 from buckling laterally, the hub plate 22 also materially aiding in holding the hub and spring connections in rigid relation to prevent lateral dishing of the wheel at the hub portion thereof. The outer ends of the main spring members 60 are bent and formed into S-shaped bearing portions and the said portions terminate in circular loops 62 that seat in circular-like sockets 15$^a$ in bearings 15 secured to the rim or felly by bolts 16$^a$, see Fig. 1, which also shows side plates 17—17$^a$, one of which 17 is cast on the bearing 15 and the other of which is removably secured on the casting and to the opposite plate 17 by bolt and rivet connections 18.

From the foregoing description read in connection with the drawings, the complete construction of both forms of my spring wheel will be readily understood.

The coöperative connections of the parts constituting the wheel are such, that the said parts may be easily assembled in their proper operative condition, securely held and also easily disconnected in case of repairs.

Among other advantages gained in my special construction and arrangement of parts is that, by reason of the S-shaped ends of the spring spokes, making each spoke V-shaped and mounting the same on the hub so that two relatively divergingly projected spoke members are produced having, as it were, a single bearing or mount on the hub and two distinct and resilient connections with the rim or felly, danger of the spokes breaking under lateral or radial compression is reduced to the minimum, the flexibility of the said spokes, especially at the S-shaped ends, serving to thoroughly dissipate the violence of shocks occurring to the rim and at the same time protecting the hub.

The tensile strength of the said spokes holds the hub concentric to the rim while the manner of connecting the inner and outer ends of the spokes tends to hold the said spokes from being deflected out of the plane of the wheel.

What I claim is:

1. A wheel comprising a rim, a hub having radial members and radial pockets, a series of spokes, one for each hub pocket and each pair of radial hub members, the said spokes each consisting of a spring bent upon itself to form diverging spoke members, the bent end of each spring being adapted for seating in a hub pocket with the diverging members engaging a coincident pair of radial hub members, a wedge block engaging each of the bent ends of the spokes, means for locking the said blocks to their spring spoke clamping position, each of the said blocks including oppositely extending lateral portions for lapping over the edges of the respective diverging members of the spring, and means for connecting the spokes and the rim.

2. A wheel comprising a rim, a hub having radial members, a series of spokes each consisting of a spring bent upon itself to form diverging spoke members, means for clamping the bent end of the spring onto one of the radial hub members, the said means consisting of a V-shaped pocket in the radial hub member for receiving the bent end of the spring, a clamp block for fitting in the bent end of the spring, a wedge lock engaging the radial hub member and the said clamp block for locking the clamp block to the bent end of the spring in the said radial hub member pocket, and other means for attaching the ends of the diverging spoke members to the rim, said clamp block having lateral lugs for engaging one edge of the adjacent spring portion, each radial hub member having like lugs for engaging the other edge portions of the spring.

3. In a spring wheel, the combination with the rim and the hub; of spokes formed of V-shaped spring members, each having its bent portion adapted for being fixedly attached to the wheel hub, the end of each diverging portion of the spring terminating in S-shaped coils with the outermost coil formed into a loop, and means for securing each of the said coiled and looped ends of the spring to the rim, the said means consisting of a pair of opposing side plates that embrace the opposite edges of the said S-shaped coils, one of the said side plates having an integral bearing formed with a socket for receiving the looped end of the coils and flanged portions for attaching to the wheel rim and clamping bolts that secure the said opposing side plates against the said coiled end of each spring portion.

OLOF A. ECKRE.